(12) United States Patent
Pandit et al.

(10) Patent No.: US 11,182,606 B2
(45) Date of Patent: Nov. 23, 2021

(54) CONVERTING CHART DATA

(71) Applicant: International Business Machines Corporation, Armonk, NY (US)

(72) Inventors: Sushain Pandit, Austin, TX (US); Su Liu, Austin, TX (US); Qin Qiong Zhang, Beijing (CN); Romelia H Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/572,914

(22) Filed: Sep. 17, 2019

(65) Prior Publication Data

US 2021/0081663 A1  Mar. 18, 2021

(51) Int. Cl.
*G06K 9/00* (2006.01)
*G01J 3/46* (2006.01)
*G06T 11/20* (2006.01)
*G06K 9/68* (2006.01)

(52) U.S. Cl.
CPC ............ *G06K 9/00469* (2013.01); *G01J 3/46* (2013.01); *G06K 9/00456* (2013.01); *G06K 9/6892* (2013.01); *G06T 11/206* (2013.01)

(58) Field of Classification Search
CPC ............ G06K 9/00469; G06K 9/6892; G06K 9/00456; G06K 9/00476; G01J 3/46; G06T 11/206
See application file for complete search history.

(56) References Cited

U.S. PATENT DOCUMENTS

| 7,386,823 | B2 | 6/2008 | Tsai et al. | |
|---|---|---|---|---|
| 2009/0235152 | A1* | 9/2009 | Rampson | G06T 11/206 715/207 |
| 2011/0115795 | A1 | 5/2011 | Koch et al. | |
| 2015/0029194 | A1* | 1/2015 | Ruble | G06F 3/04842 345/440 |
| 2016/0055659 | A1* | 2/2016 | Wilson | G06F 3/04842 715/771 |
| 2017/0161354 | A1* | 6/2017 | Cho | G06F 40/18 |
| 2017/0185835 | A1* | 6/2017 | Appel | G06F 16/5846 |

(Continued)

FOREIGN PATENT DOCUMENTS

| CN | 108763177 A | 11/2018 |
|---|---|---|
| JP | 2017501508 A | 1/2017 |

OTHER PUBLICATIONS

Ondesoft, "Pixel Ruler for Mac", printed Jun. 11, 2019, 3 pages, https://www.ondesoft.com/rulers/pixel-ruler.html.

(Continued)

*Primary Examiner* — Christopher M Brandt
(74) *Attorney, Agent, or Firm* — Donald J. O'Brien

(57) ABSTRACT

Embodiments are disclosed for generating tables from charts. The techniques include determining a chart type of a selected chart. The techniques include determining a plurality of chart elements of the selected chart. Further, the techniques include determining a plurality of measurements of a plurality of data representations of the selected chart. Additionally, the techniques include determining a plurality of corresponding numeric values for the measurements based on the chart elements. Also, the techniques include generating a data table comprising the chart elements and the corresponding numeric values.

20 Claims, 10 Drawing Sheets

(56) References Cited

U.S. PATENT DOCUMENTS

| | | |
|---|---|---|
| 2018/0204360 A1 | 7/2018 | Bekas et al. |
| 2018/0211108 A1 | 7/2018 | Lahmann et al. |
| 2019/0266434 A1* | 8/2019 | Yu .................. G06T 11/206 |

OTHER PUBLICATIONS

Al-Zaidy et al., "Automatic Extraction of Data from Bar Charts", K-CAP 2015, Oct. 7-10, 2015, 4 pages.

Mell et al., "The NIST Definition of Cloud Computing", Recommendations of the National Institute of Standards and Technology, Sep. 2011, 7 pages.

\* cited by examiner

CONVERTING CHART DATA

BACKGROUND

The present disclosure relates to charts, and more specifically, to converting chart data into a different representation.

Charts can be used to represent sizeable numerical and statistical data in a time- and space-effective manner. Numerical figures presented in statistical charts, for example, are a useful way to present sizeable amounts of complex data in a space-saving, easy-to-understand manner. In this way, charts can make the resulting document appear clutter-free and visually appealing.

SUMMARY

Embodiments are disclosed for determining chart data. The techniques include determining a chart type of a selected chart. The techniques include determining a plurality of chart elements of the selected chart. Further, the techniques include determining a plurality of measurements of a plurality of data representations of the selected chart. Additionally, the techniques include determining a plurality of corresponding numeric values for the measurements based on the chart elements. Also, the techniques include generating a data table comprising the chart elements and the corresponding numeric values.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
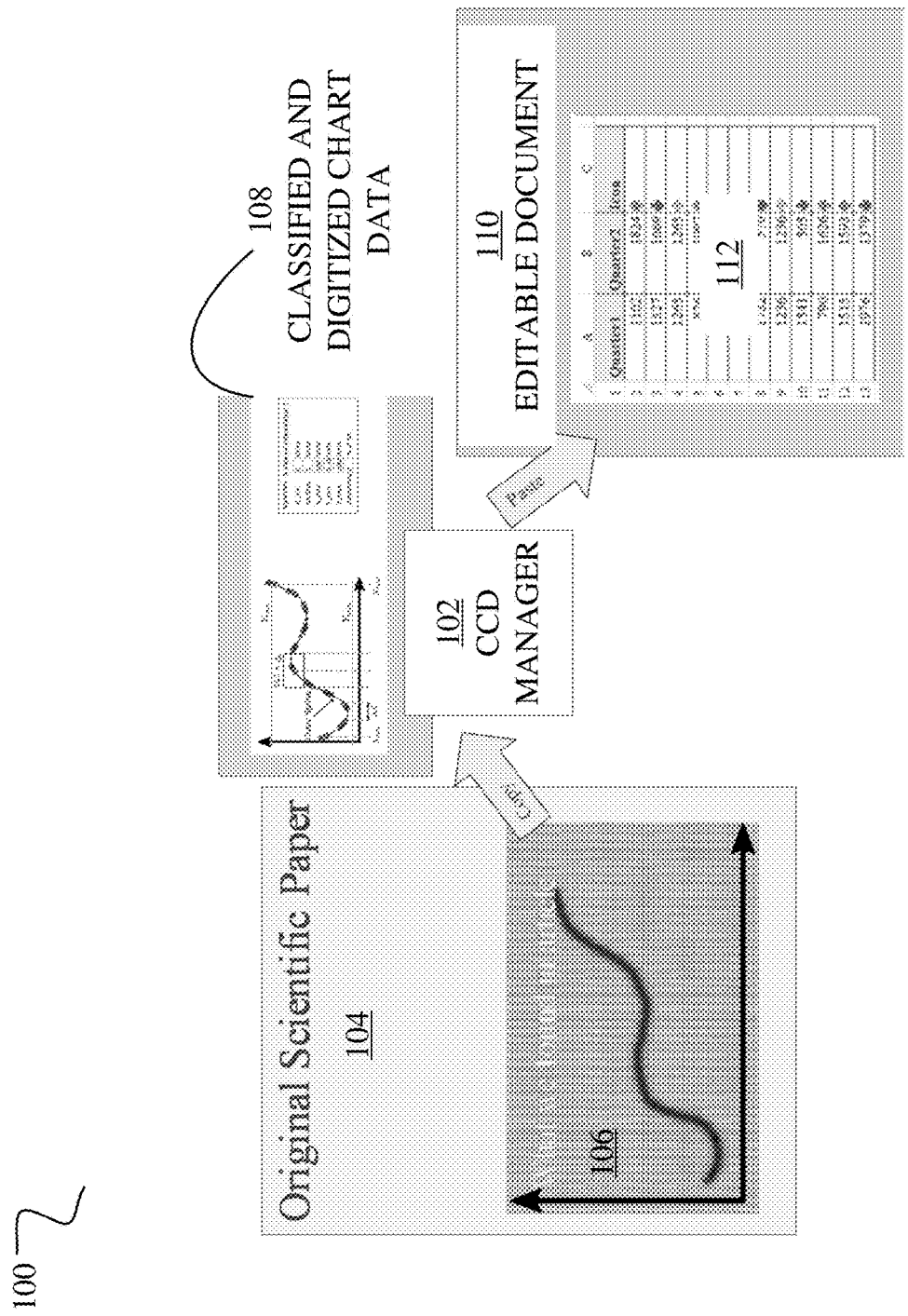
FIG. 1 is a pictorial diagram of a system to copy and paste chart data, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Many scientific charts are generated from data tables. In many published and printed papers, the numeric contents, e.g., data table, of the scientific figures are not available for the readers. As such, the scientific figures within many published papers are considered unstructured data. However, it can be challenging to deal with images in papers that are unstructured data. For instance, in scientific discussions, literature reviews, intellectual property analysis, biochemistry experiment verifications, and the like, readers may want to restore data values of column charts or/and pie charts to a data table for examining the scientific hypothesis, statistic evidence, conclusions, etc. Further, readers may want to copy and cite the chart data and paste them to a new analysis report. Additionally, readers may want to implement the mathematic formulas or equations from a chart and use a ruler to measure the charts and convert physical dimensions of the chart back to numeric data. However, the readers may not know the formula or equation used. Also, readers may want to generate similar charts, but with new styles, colors, patterns, parameters, or scales. In other scenarios, readers may want to convert data of a chart from U.S. customary measurement system to the metric system. Readers may also want to transfer a type or style of a chart to another type or style through copy and paste chart operations.

It is possible to derive the numeric contents of a chart through measurement and analysis. However, it can be cumbersome to measure dimensions of objects on the papers or desktops with a physical ruler. There are some screen rulers available that can help a user accurately measure on-screen elements of a chart. However, these types of rulers are left for the user to leverage in a manual manner. Thus, the user may be able to determine the numeric contents of a chart if the user has paper available, has the screen ruler software available, and understands how to use the software to take manual measurements and generate data tables from the determined numbers.

Accordingly, embodiments of the present disclosure can provide real-time scientific classification and digitization of chart data that identifies and otherwise determines the data represented in a chart. Additionally, embodiments can provide a copy and paste chart operation whereby the chart is selected for a copy, and whereby the data represented in the chart is derived and subsequently pasted into a document in a selected form. The reader can select the form, such as, a data table in a spreadsheet document, or a different type of chart in a word processing document. In this way, the copy and paste chart operation can be integrated with real-time scientific chart classification and digitization (CCD) for simplifying unstructured data processing: normalization, conversion, validation, and restoration.

Referring now to FIG. 1, which is a pictorial diagram of a system 100 to copy and paste chart data, in accordance with some embodiments of the present disclosure. The system 100 includes a CCD manager 102, an original scientific paper 104 containing a chart 106, a classified and digitized chart data 108, and an editable document 110. According to embodiments of the present disclosure, the CCD manager 102 can perform a copy and paste chart operation in the system 100. More specifically, the original scientific paper 104 can be a document describing the scientific process for testing a hypothesis. This description can include the chart 106, which can represent the experimental data collected to test the hypothesis, such as volumes, weights, and other relevant measured, observed, and/or recorded data. Using the CCD manager 102, the chart 106 can be selected for the copy and paste chart operation.

Once selected, the CCD manager 102 can perform chart classification and digitization to determine the values of the experimental data represented in the chart 106. In this way, the CCD manager 102 can generate the classified and digitized chart data 108. The classified and digitized chart data 108 can include elements of the chart (e.g., the title, legend, and labels), unit and scale identification, the numeric values represented in the chart 106, and so on. In this way, this copy and paste chart operation can provide further value from the chart 106, perhaps beyond the scope of the original scientific paper 104. For example, the CCD manager 102 can perform the paste by saving a subset of the classified and digitized chart data 108 into an editable document 110, such as a spreadsheet. In this example, the CCD manager 102 populates a data table 112 with the numeric values derived by the CCD manager 102 from the chart 106. In this way, the CCD manager 102 can perform a copy and paste chart operation of the chart 106.

However, the CCD manager 102 is not limited to performing the copy and paste chart operation on charts in scientific papers testing hypotheses, as described above. Rather, this is merely one example of the context of charts that can be copied and pasted with chart classification and digitization. The CCD manager 102 can perform the copy and paste chart operation using various types of charts, which may be presented to a viewer alone, or in combination with an article that may be informational or entertaining, for example.

Figure 2:
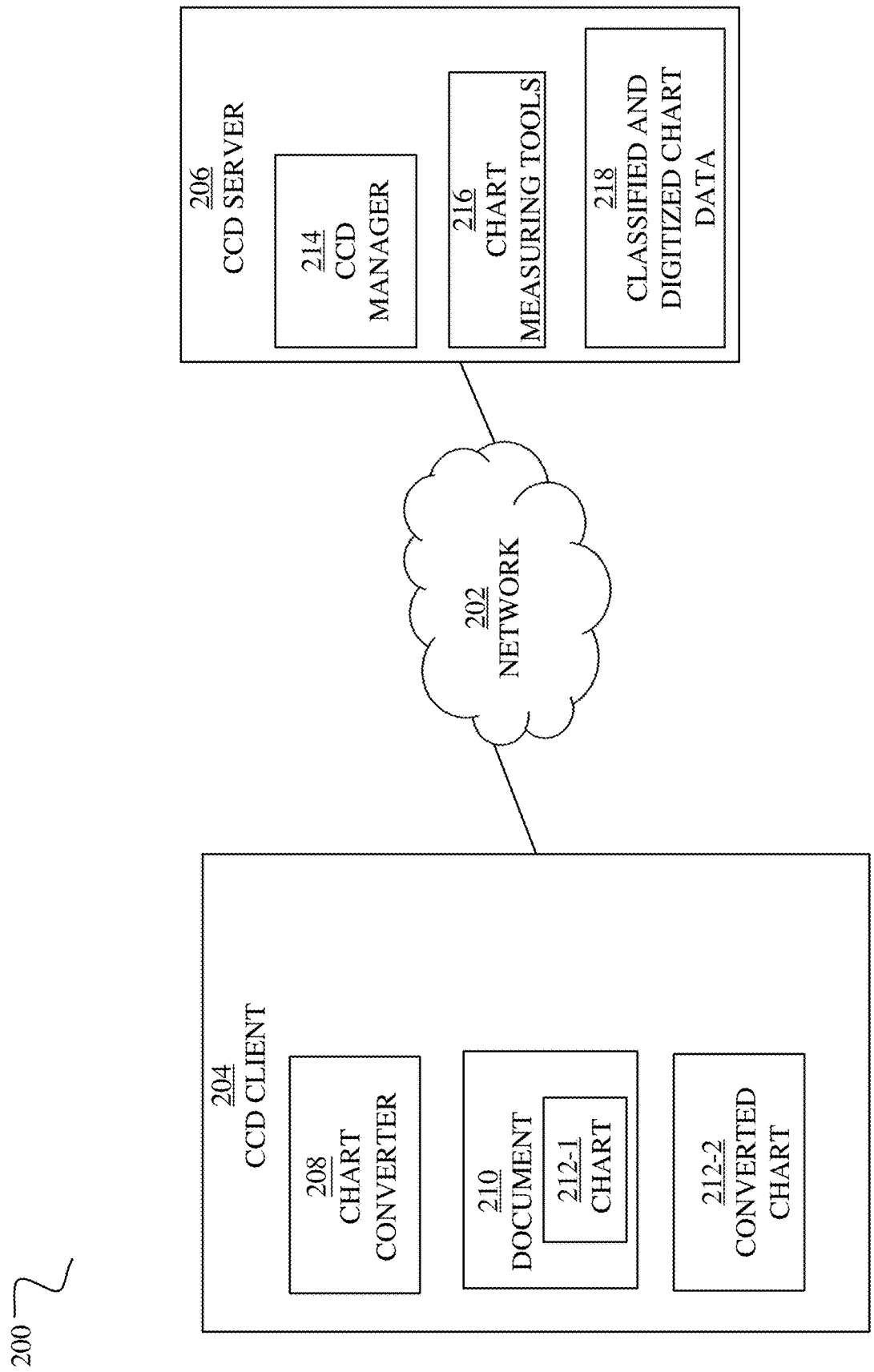
FIG. 2 is a block diagram of a CCD system to copy and paste chart data, in accordance with some embodiments of the present disclosure.

Referring now to FIG. 2, which is a block diagram of a CCD system 200 to copy and paste chart data, in accordance with some embodiments of the present disclosure. The CCD system 200 can be similar to the CCD system 100 described with respect to FIG. 1. The CCD system 200 includes a network 202, a CCD client 204, and a CCD server 206.

The network 202 can include one or more electronic communication networks, such as a local area network and/or a wide area network, such as, the Internet. While the system 200 shows both a CCD client 204 and a CCD server 206, in alternative embodiments, the system 200 can include the components of CCD client 204 and CCD server 206 in a single, stand-alone computing device.

The CCD client 204 and CCD server 206 can be computing devices, such as a desktop, laptop, tablet, smartphone, server, rack server, and the like. The CCD client 204 can include a chart converter 208, and a document 210 having a chart 212-1. According to embodiments of the present disclosure, the CCD client 204 can present the document 110 for viewing on a display device. The document can be, for example, a scientific paper or magazine article in an electronic format, such as, a word processing document. The chart converter 208 can enable the viewer to make a selection of the chart 212-1 for a copy and paste chart operation. For example, in response to a right-click mouse operation on the chart 212-1, the chart converter 208 can provide a context menu. The context menu can include a selectable option for copying the chart 212-1. In response to such a selection, the chart converter 208 can capture an image of the chart 212-1. Additionally, the chart converter 208 can send the captured image in a request to classify and digitize the data represented in the chart 212-1. According to embodiments of the present disclosure, the chart converter 208 can send this request to the CCD server 206.

The CCD server 206 can include a CCD manager 214, chart measuring tools 216, and classified and digitized chart data 218. The CCD manager 214 can be a computer application in communication with the chart converter 208. In some embodiments, the CCD manager 214 can be provided as a cloud service, such as provided in a software application as a service (SaaS). In response to the request from the chart converter 208 to classify and digitize data from the chart 212-1, the CCD manager 214 can analyze the chart 212-1. Analyzing the chart 212-1 can include identifying the type of chart, labels of the data represented, values of the data, and the like.

To determine the values of the data, the CCD manager 214 can use one or more chart measuring tools 216 to analyze the captured image of the chart 212-1, and automatically identify the numeric data values represented by automatically measuring representative lines, bars, and pie slices, for example. Further, the chart measuring tools 216 can calculate the numeric values represented in the chart 212-1 based on the measurements determined and other relevant data of the chart 212-1. The chart measuring tools 216 can include a ruler and grid tool, which can be useful for measuring the bars and lines of bar graphs and line graphs, respectively. Additionally, the chart measuring tools 216 can include a protractor tool, which can be useful for measuring angles of the slices of a pie graph. The CCD manager 214 can also, or alternatively, use other chart measuring tools that are configured to determine measurements based on how the data is represented graphically. Accordingly, the CCD manager 214 can generate the classified and digitized chart data 218 based on the chart type and other metadata, and the values calculated by the chart measuring tools 216. The CCD manager 214 can this use the classified and digitized chart data 218 to generate the data of the chart 212-1 in another form, such as a converted chart 212-2.

Accordingly, the chart converter 208 can make a request of the CCD manager 214 to paste the classified and digitized chart data 218 into the converted chart 212-2. The converted chart 212-2 can be a spreadsheet or other word processing document that represents data from the chart 212-1 in a different form. For example, the chart 212-1 can be a bar graph representation of survey data. According to embodiments of the present disclosure, the chart converter 208 can copy the chart 212-1 and paste some subset of the representative data into a pie chart, and/or into a spreadsheet table. In some embodiments, the viewer can select the paste chart operation from a right-clicked context menu, or as an option within a predetermined computer application menu configuration. The copy chart operation can be selected in this manner as well.

Figure 3:
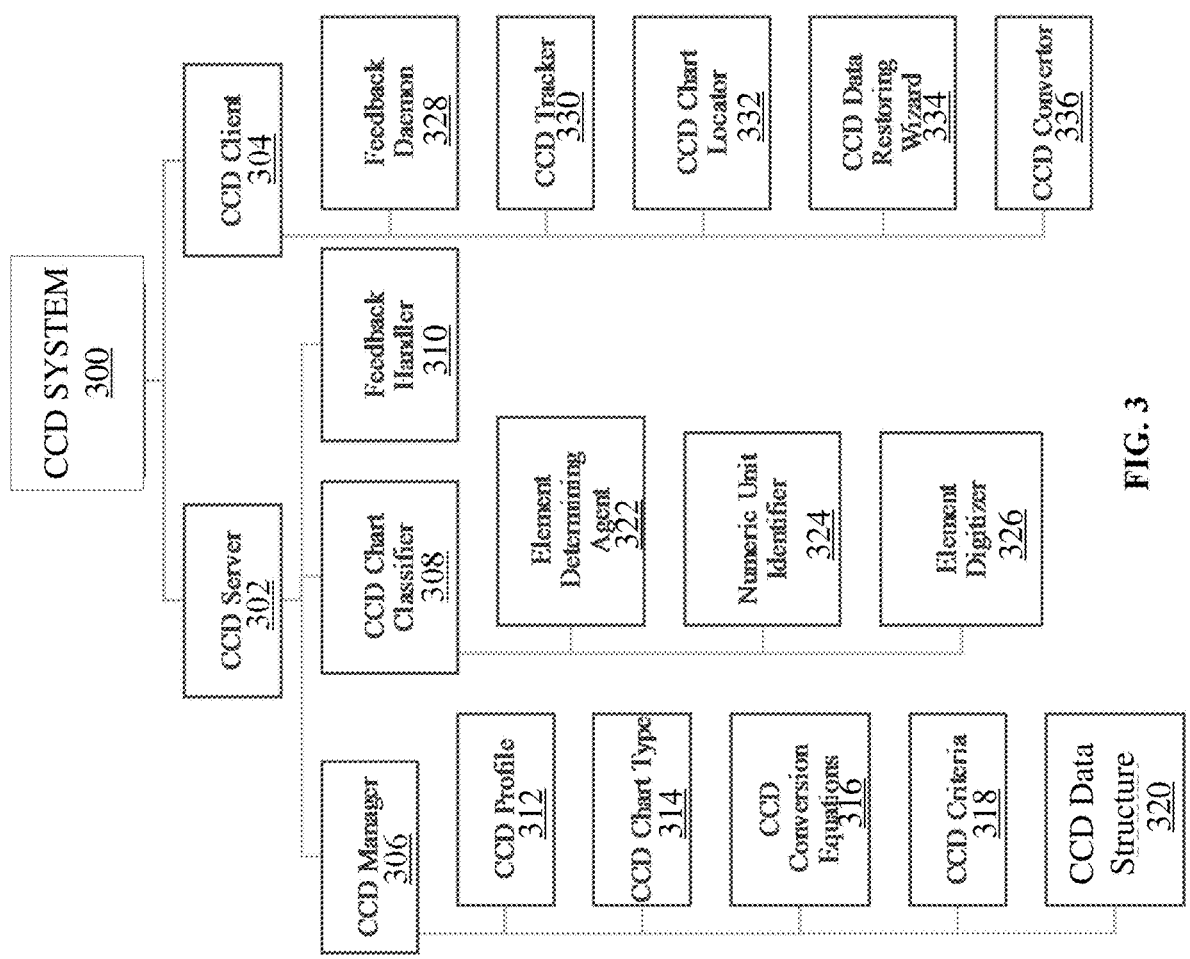
FIG. 3 is a more detailed block diagram of an example CCD system to copy and paste chart data, in accordance with some embodiments of the present disclosure.

Referring now to FIG. 3, which is a more detailed block diagram of an example CCD system 300 to copy and paste chart data, in accordance with some embodiments of the present disclosure. The CCD system 300 includes a CCD server 302 and a CCD client 304. The CCD system 300 can be similar to the CCD systems 100, 200 described with respect to FIGS. 1 and 2. The CCD server 302 can be similar to the CCD server 206 described with respect to FIG. 2.

Additionally, the CCD client 304 can be similar to the CCD client 204 described with respect to FIG. 2. The CCD client 304 can be a client-side program for collecting copy and paste chart requests and communicating with the CCD server 302 to restore and/or convert selected charts as requested. The CCD client 304 includes a feedback daemon 328, CCD tracker 330, a CCD chart locator 332, a CCD data restoring wizard 334, and a CCD converter 336. The CCD tracker 330 can monitor the viewing of a chart, such as the chart 212-1. Additionally, the CCD tracker 330 can determine the context of the chart viewing. More specifically, the CCD tracker 330 can determine if the viewer has selected the chart 212-1 for a copy chart operation.

The CCD chart locator 332 can locate a selected chart object and upload the selected chart object to the CCD server 302 for chart data restoration and conversion. For example, the CCD Chart Locator 332 can be triggered by an operation of chart selection, and then upload the selected chart to the CCD server 302 for CCD.

The CCD data restoring wizard 334 can receive digitized chart data from the CCD server 302 and then populate the digitized chart data into a data table, such as the data table 112 in the editable document 110 described with respect to FIG. 1. The populated data table can be generated in various file formats and stored in a memory, in a metadata, in a cloud storage, and the like. However, if the current embedded image metadata protocol is not large enough to store the data and metadata of a selected chart, then cloud-based, linked metadata can be used. The current embedded image metadata protocol can be any kind of image or scientific chart metadata standards. For example, some spreadsheet software includes tools to automatically generate charts from data in the spreadsheets. To support this capability, the spreadsheet software can associate metadata with such charts.

The CCD converter 336 can convert the selected chart to another type of chart as selected. For instance, a pie chart on the source document can be selected, and then pasted as column chart.

The feedback daemon 328 can learn the chart processing information, collect feedback and send the collected feedback to the CCD server 302 for adjusting filtering algorithm. The filtering algorithm can identify predetermined chart selections.

The CCD server 302 can be a server side program for restoring and converting the client selected charts. Additionally, the CCD server 302 can include a CCD manager 306, a CCD chart classifier 308, and a feedback handler 310. The CCD Manager 306 can be similar to the CCD manager 112 described with respect to FIG. 1. Referring back to FIG. 3, the CCD manager 306 can manage a CCD profile 312, CCD chart type 314, CCD conversion equations 316, CCD criteria 318, and a CCD data structure 320.

The CCD conversion equations 316 can define a set of conversion equations (to measure Column Height, Bar Length, Portion of Pie, etc.) from chart elements to data values. For example, the CCD conversion equations can define the relationship between numeric values and the percentages and degrees of angles of portions (1%=3.6°). In this way, the CCD conversion equations 316 can be used as percentage conversion equations from measured angle degrees. In some embodiments, a CCD administrator (not shown) can collect and define the set of conversion equations according to the different types of charts. If the predefined conversion equations do not have capabilities for a specific chart, then the feedback handler 310 can request a new equation definition. This mechanism enables the feedback handler 310 to learn new graph or chart types and correlated equations. Additionally, the CCD conversion equations 316 can be preprogrammed to automate the identification of equations for calculating the degrees of angle proportions according the CCD Criteria 318.

The CCD criteria 318 can be a set of rulers for determining chart types, unit types, legend, title, elements; axis, center of pie, radius of pie; calculating the element coordinates, lengths, heights, angles; converting the coordinates into correlated values. For instance, the CCD criteria 318 can include a ruler and grid tool for measuring the length and height of a bar or column; and a protractor tool for measuring the angle of a portion of a pie chart element.

The CCD profile 312 can describe the parameters for evaluating chart types, chart elements, and the like. The CCD chart type 314 can define a set of scientific graph or chart types. These types can include, for example, bar, column, 2-D and/or 3-D line, pie, and the like. The CCD data structure 320 can be a data structure for saving and tracking the element data types, units, and values. For example, the CCD data structure 320 can include a paperID, ChartID, ChartType, CoordinateType (X, Y, Z), ElementGroup(X, Y, Z), ElementList[X,Y,X], ElmentArray[value] [Unit, etc.]).

The feedback handler 310 can learn new graph and chart types. Additionally, the feedback handler 310 can receive or request feedback and refine the CCD conversion equations 316 and CCD criteria 318. For instance, if a user uses a new chart editing tool to create or modify a new chart, the original data table can be collected as metadata with the chart. In addition, a manual chart restoring descriptions and correlated measurement operations also can be learned by the feedback handler 310. For example, on the client side, the feedback daemon 328 can log context information from the discussion and operation in a given paper containing the selected chart. Additionally, the feedback daemon 328 can log context information from a restoration operation. In one example, the context information can identify a "Paper-Y" that measures the data of a chart from a cited reference, "Paper-X," with a ruler. Accordingly, the feedback handler 310 can compare the original chart and received restored data to create a new set of CCD rules for restored data for a new chart. As such, the new collected relationship between the data and chart can be learned for restoring similar charts in the future. In some embodiments, the feedback handler 310 can accomplish this learning through machine learning and/or from feedback provided by the viewer.

The CCD chart classifier 308 can classify the type of selected chart, such as, bar, column, 2-D line, pie). In some embodiments, the CCD chart classifier 308 can determine the chart type identification using an image analysis tool.

The element determining agent 322 can determine the chart elements. The chart elements can include, for example, the legend, title, x-axis, y-axis, z-axis, bars, columns, center of the pie, radius of the pie, slices of the pie, and the like.

The numeric unit identifier 324 can identify numeric units and their scales represented in the chart or graph. Numeric units can include, for example, meter, gram, date, time, percentage, and the like. Scales can be, for example, 10%, 20%, 100%, of each of the chart elements.

The element digitizer 326 can digitize the identified elements of the selected chart into corresponding unit values. For example, the element digitizer 326 can determine the numeric value equivalents of the values represented by the bars of a bar chart, or the pie portions of a pie chart. In this way, the element digitizer 326 can measure the selected graph and determine the CCD conversion equations 318.

Figure 4:
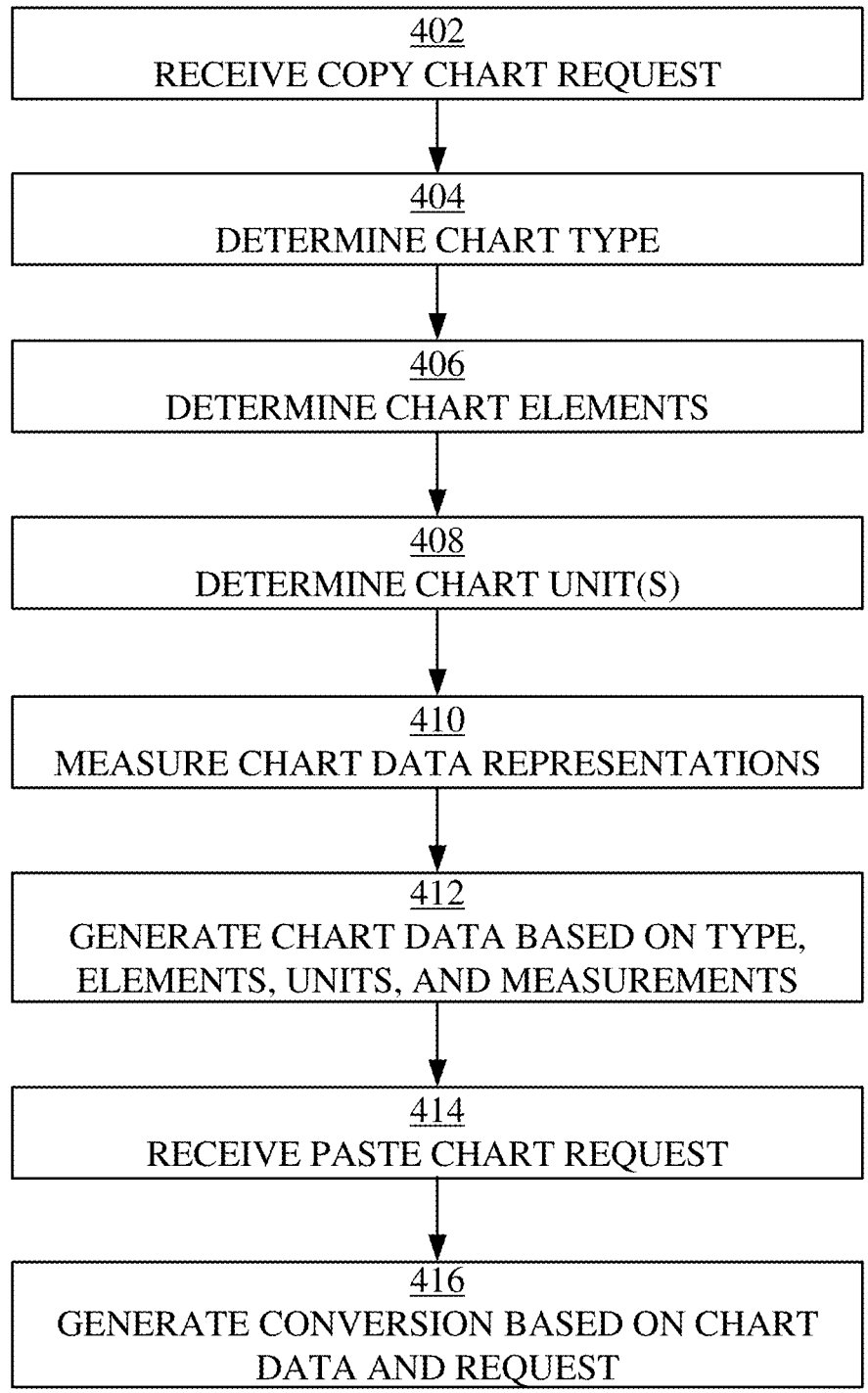
FIG. 4 is a flow chart of an example method to copy and paste chart data, in accordance with some embodiments of the present disclosure.

FIG. 4 is a flowchart of an example method 400 to copy and paste chart data, in accordance with some embodiments of the present disclosure. A CCD manager, such as the CCD manager 214 can perform the method 400. Accordingly, at block 402, the CCD manager 214 can receive a copy chart request. According to embodiments of the present disclosure, the chart converter 208 can send a copy chart request to the CCD manager 214. More specifically, the chart converter 208 can capture an image of a chart selected by a viewer in response to a request to perform a copy from the viewer. Further, the chart converter 208 can include the captured image in the copy chart request.

At block 404, the CCD manager 214 can determine the chart type. More specifically, the CCD chart classifier 308 can identify bar, column, line, and other chart types based on the analysis provided by an image analysis tool. In some embodiments the CCD manager 214 can analyze the captured image of a chart, and identify the chart type by selecting an available type from the CCD chart type 314 that is associated with the chart image provided.

At block 406, the CCD manager 214 can determine the chart elements. In other words, the CCD manager 214 can identify, for example, the axes of bar or line charts, the legend, title, and the like by analyzing the image of the chart. Techniques for identifying the chart elements can include optical character recognition, among others.

At block 408, the CCD manager 214 can determine the chart units. In other words, the CCD manager 214 can identify the standard of measurement for the data represented in the chart based on the chart elements. Textual data identified in the chart elements can be compared to potential standards of measurement for selection. The standards of measurement can include, for example, inches, feet, meters, pounds, kilograms, miles, kilometers, cubic centimeters, population sizes, and so on.

At block 410, the CCD manager 214 can measure chart data representations. The chart data representations can be the chart elements that represent the data of the chart, i.e., the numeric data. Thus, for a bar chart, the CCD manager 214 can measure the height of a bar, the angle of a pie portion, and the like. As described with respect to FIG. 2, the CCD manager 214 can use chart measuring tools 216 to perform the chart data measurements.

Referring back to FIG. 4, at block 412, the CCD manager 214 can generate chart data based on the chart type, chart elements, chart units, and chart measurements. The chart data can be similar to the classified and digitized chart data 218 described with respect to FIG. 2.

Referring back to FIG. 4, at block 414, the CCD manager 214 can receive a paste chart request. As stated previously, the chart converter 208 can send the paste chart request once the classified and digitized chart data 218 is generated. The paste chart request can indicate a specific type of conversion. The types of conversion can include table generation and chart generation. A requested chart generation for the paste can specify a different type of chart to generate than the original chart that is copied.

At block 416, the CCD manager 214 can generate a conversion based on the chart data and the paste chart request. The CCD manager 214 can correlate the measurements with representative numeric values. Further, the CCD manager 214 can generate a data table, label columns and rows based on the chart elements. Additionally, the CCD manager 214 can populate the data table with the numeric equivalents calculated based on the measurement values. Alternatively, the CCD manager 214 can generate the requested chart type using the classified and digitized chart data 218.

Figure 5:
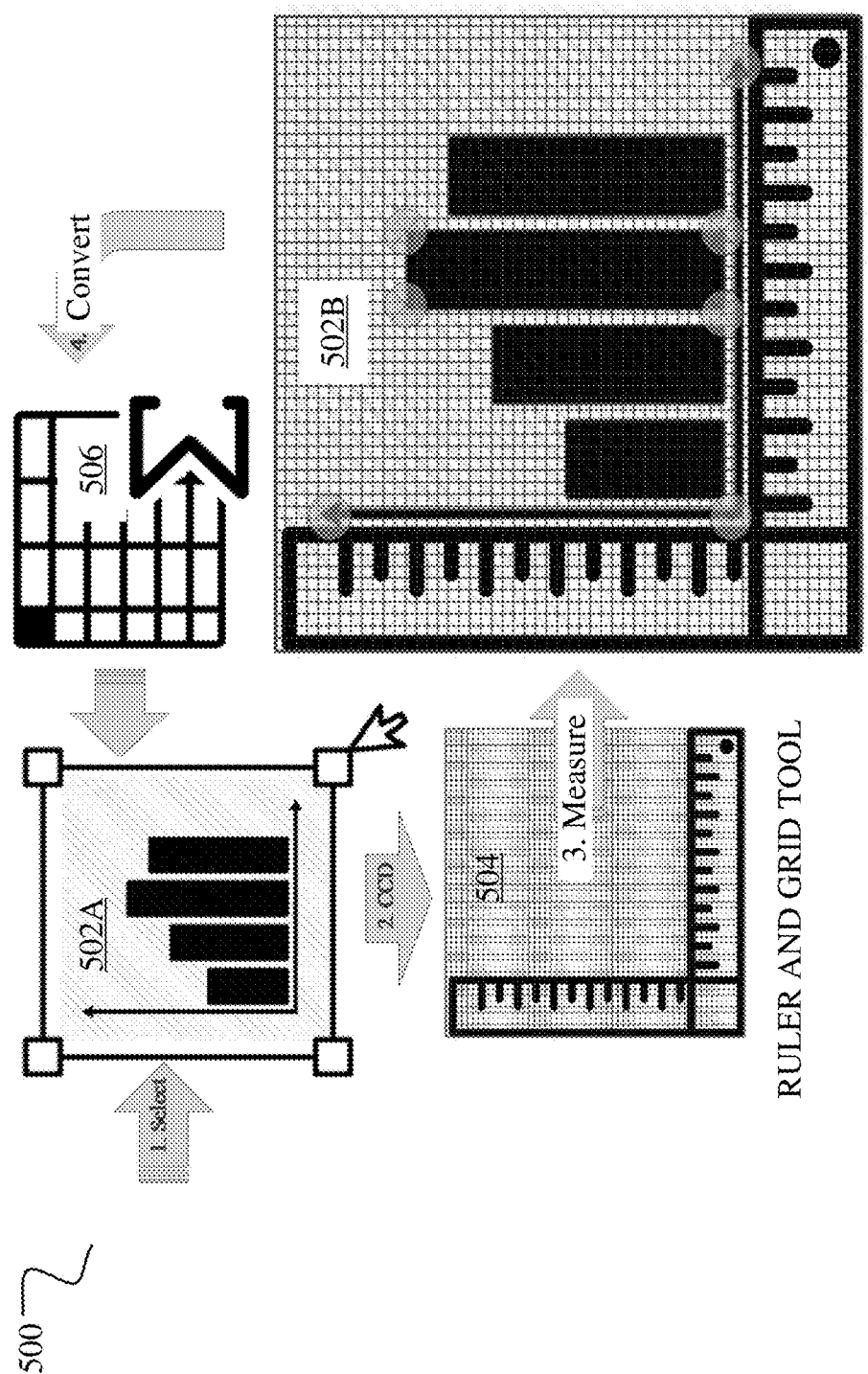
FIG. 5 is a pictorial diagram of an example method to copy and paste bar graph chart data, in accordance with some embodiments of the present disclosure.

FIG. 5 is a pictorial diagram of an example method 500 to copy and paste bar graph chart data, in accordance with some embodiments of the present disclosure. The method 500 can be performed by the chart converter 208 and the CCD manager 214. The method 500 involves operations 1 through 4, beginning with operation 1, "Select."

At operation 1, the chart converter 208 can select a chart 502A for a copy chart operation. In this example, the chart 502A is a bar chart. As stated previously, the option to select the copy chart operation can be provided in a standard file menu, or in a context menu, for example.

At operation 2, "CCD," the CCD manager 214 can select a chart measuring tool for measuring the data represented in chart 502A. The chart measuring tool can be similar to the chart measuring tools 216 described with respect to FIG. 2. As stated previously, the chart measuring tool selected can be based on the chart type. In this example, the chart 502A is a bar chart. Accordingly, the CCD manager 214 can select a ruler and grid tool 504 to measure the bar elements of the chart 502A.

At operation 3, "Measure," the CCD manager 214 can use the ruler and grid tool 504 to measure the data representations on a captured chart image 502B. As stated previously, the chart converter 208 can generate the captured chart image 502B of the chart 502A, and send the captured chart image 502B with the request for the copy chart operation. Once measured, the CCD manager 214 can generate the classified and digitized chart data 218 for the chart 502A.

At operation 4, "Convert," the CCD manager 214 can generate the requested conversion based on the classified and digitized chart data and the requested conversion. In this example, the requested conversion can be a data table 506. Additionally, in response to a request, the CCD manager 214 can use the data table 506 to re-generate the original chart 502A. The arrow from the data table 506 to the chart 502A represents such an operation.

Figure 6:
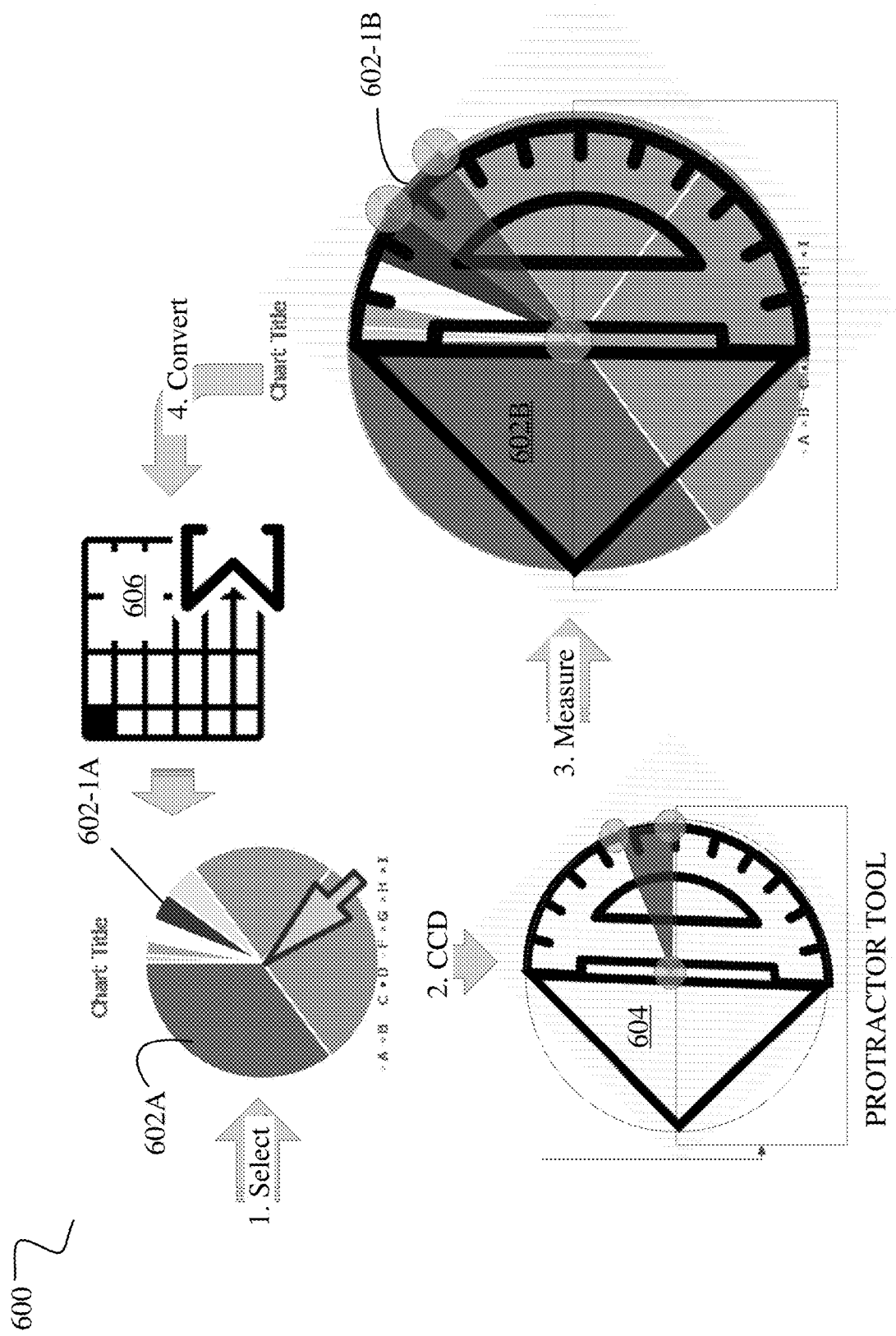
FIG. 6 is a pictorial diagram of an example method to copy and paste pie graph chart data, in accordance with some embodiments of the present disclosure.

FIG. 6 is a pictorial diagram of an example method 600 to copy and paste chart data, in accordance with some embodiments of the present disclosure. The method 600 can be performed by the chart converter 208 and the CCD manager 214. The method 600 involves operations 1 through 4, beginning with operation 1, "Select."

At operation 1, the chart converter 208 can select a chart 602A for a copy chart operation. In this example, the chart 602A is a pie chart. As shown, the chart 602A includes slices, such as slice 602-1A.

At operation 2, "CCD," the CCD manager 214 can select a chart measuring tool for measuring the data represented in chart 602A. The chart measuring tool can be similar to the chart measuring tools 216 described with respect to FIG. 2. As stated previously, the chart measuring tool selected can be based on the chart type. In this example, the chart 602A is a pie chart. Accordingly, the CCD manager 214 can select a protractor tool 604 to measure the slice elements of the chart 602A.

At operation 3, "Measure," the CCD manager 214 can use the protractor tool 604 to measure the data representations on a captured chart image 602B. As stated previously, the chart converter 208 can generate the captured chart image 602B of the chart 602A and send the captured chart image 602B with the request for the copy chart operation. With specific respect to measuring with the protractor tool 604, the protractor tool 604 can measure the angle of all the pie slices, such as pie slice 602-1B in the capture image 602B. The pie slice 602-1B in this example corresponds to the pie slice 602-1A from the original chart 602A. Once measured, the CCD manager 214 can generate the classified and digitized chart data 218 for the chart 602A.

At operation 4, "Convert," the CCD manager 214 can generate the requested conversion based on the classified and digitized chart data 218 and the requested conversion. In this example, the requested conversion can be a data table 606. Additionally, in response to a request, the CCD manager 214 can use the data table 606 to re-generate the original chart 602A. The arrow from the data table 606 to the chart 602A represents such an operation.

Figure 7:
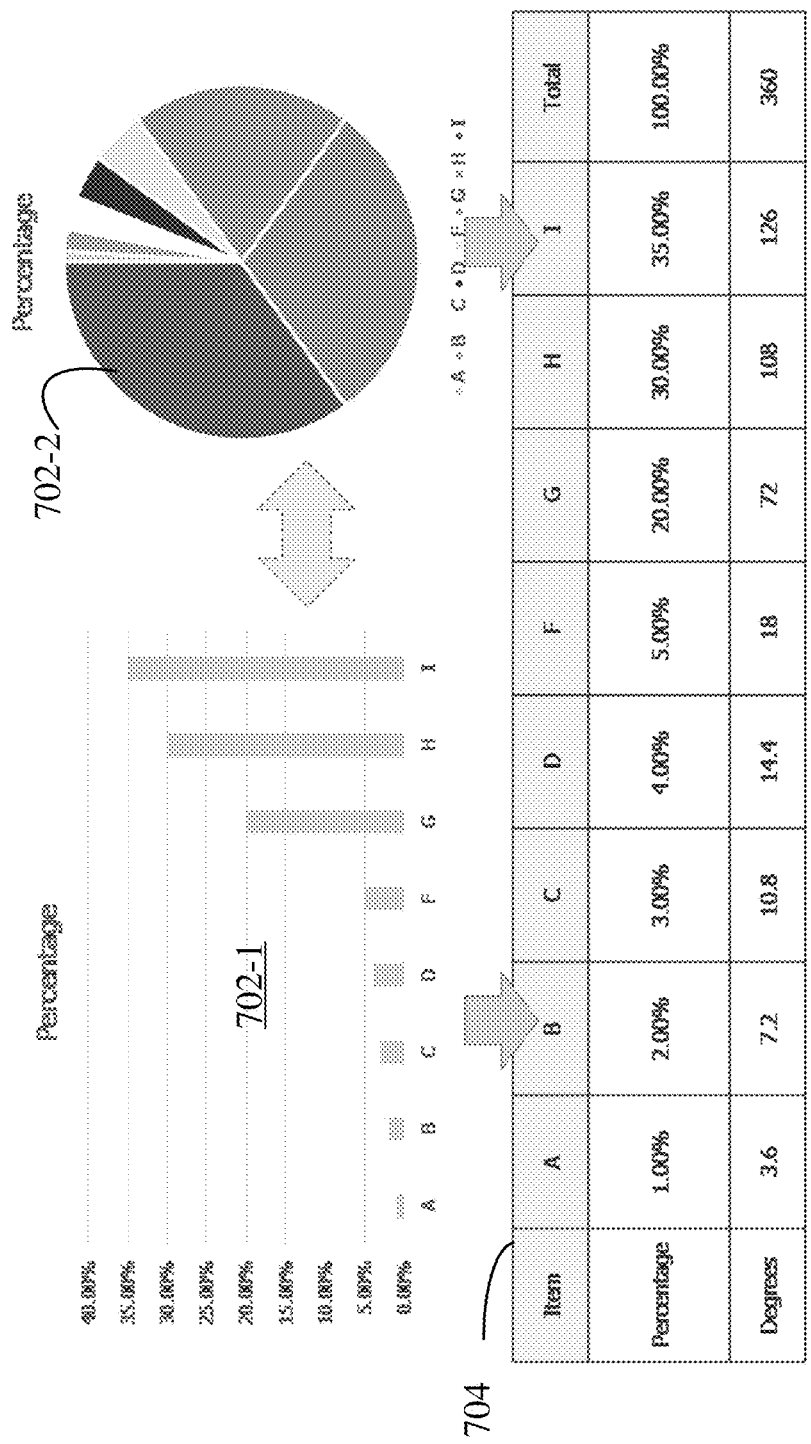
FIG. 7 is a pictorial diagram of an example chart conversion, in accordance with some embodiments of the present disclosure.

FIG. 7 is a pictorial diagram of an example chart conversion, in accordance with embodiments of the present disclosure. The example chart conversion uses a chart 702-1 that can be selected by the chart converter 208 in a request for a copy chart operation. As described above, the CCD manager 214 can analyze the selected chart 702-1 to identify chart elements and representative data. Additionally, the CCD manager 214 can use chart measuring tools 216 to derive numeric values for the data represented in the chart 702-1 to generate the classified and digitized chart data 218. Further, in response to a paste chart request, the CCD manager 214 can generate a data table, such as the table 704. Accordingly, the CCD manager 214 can generate an alternate chart 702-2. Similarly, the CCD manager 214 can analyze a chart 702-2 to identify chart elements and representative data to generate the table 704. Further, the CCD manager 214 can generate either of chart 702-1 and 702-2 through a copy and paste chart operation of the other. In other words, using the copy and paste chart operation described herein, the CCD manager 214 can generate the chart 702-2 from the chart 702-1. Similarly, the CCD manager 214 can generate the chart 702-1 from the chart 702-2 with the copy and paste described herein.

Figure 8:
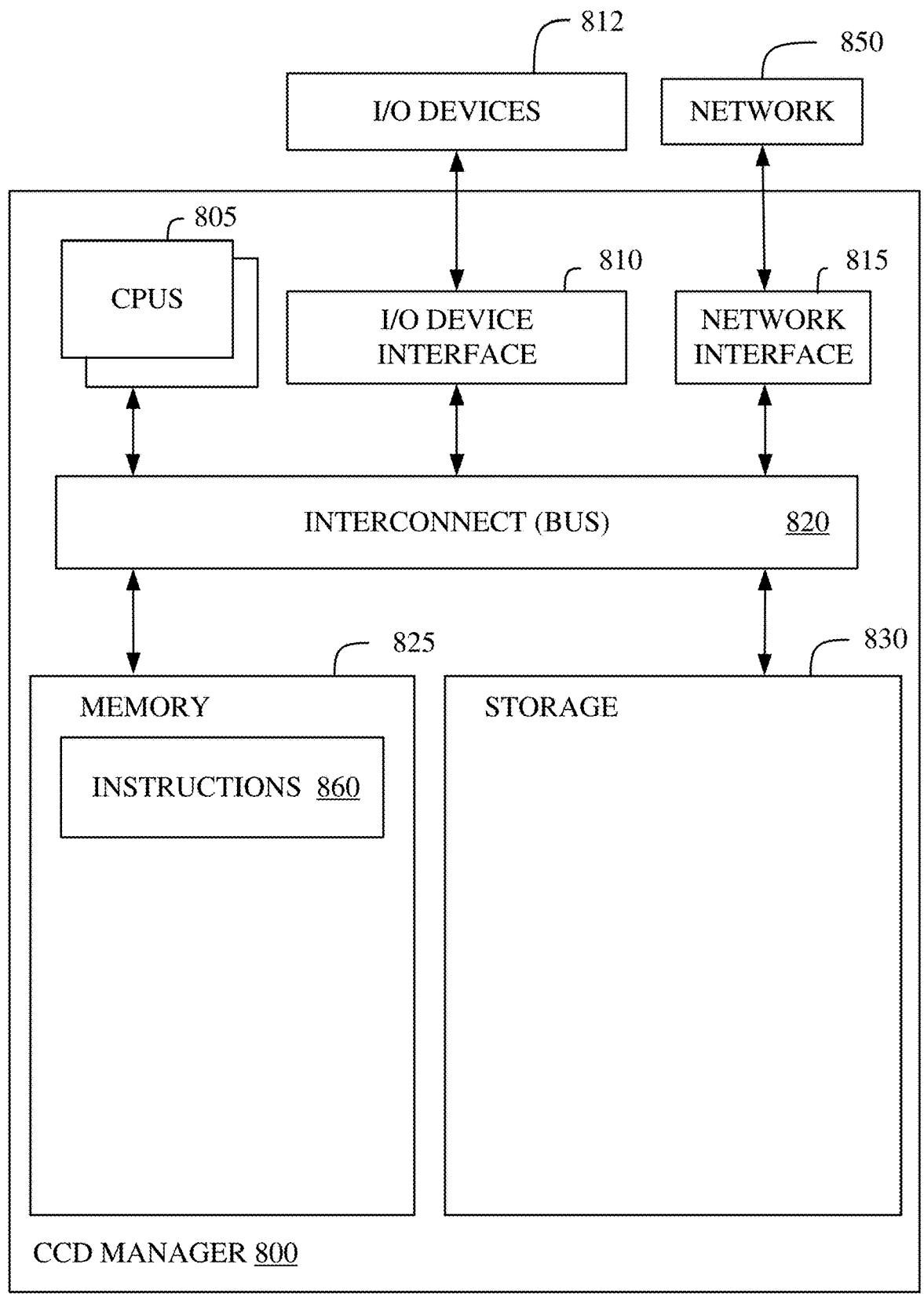
FIG. 8 is a block diagram of an example classifying chart digitization (CCD) manager, in accordance with some embodiments of the present disclosure.

Referring now to FIG. 8, illustrated is a block diagram of an example CCD manager 800, in accordance with some embodiments of the present disclosure. In various embodiments, the CCD manager 800 is similar to the CCD manager 214 and can perform the methods described in FIGS. 3-7 and/or the functionality discussed in FIGS. 1, 2, and 8-10. In some embodiments, the CCD manager 800 provides instructions for the aforementioned methods and/or functionalities to a client machine such that the client machine executes the method, or a portion of the method, based on the instructions provided by the CCD manager 800. In some embodiments, the CCD manager 800 comprises software executing on hardware incorporated into a plurality of devices.

The CCD manager 800 includes a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or the storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, and/or flash memory devices. Additionally, the storage 830 can include storage area-network (SAN) devices, the cloud, or other devices connected to the CCD manager 800 via the I/O device interface 810 or a network 850 via the network interface 815.

In some embodiments, the memory 825 stores instructions 860. However, in various embodiments, the instructions 860 are stored partially in memory 825 and partially in storage 830, or they are stored entirely in memory 825 or entirely in storage 830, or they are accessed over a network 850 via the network interface 815.

Instructions 860 can be processor-executable instructions for performing any portion of, or all, any of the methods of FIGS. 3-7 and/or the functionality discussed in FIGS. 1, 2, and 8-10.

In various embodiments, the I/O devices 812 include an interface capable of presenting information and receiving input. For example, I/O devices 812 can present information to a listener interacting with CCD manager 800 and receive input from the listener.

The CCD manager 800 is connected to the network 850 via the network interface 815. Network 850 can comprise a physical, wireless, cellular, or different network.

In some embodiments, the CCD manager 800 can be a multi-user mainframe computer system, a single-user system, or a server computer or similar device that has little or no direct user interface but receives requests from other computer systems (clients). Further, in some embodiments, the CCD manager 800 can be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary CCD manager 800. In some embodiments, however, individual components can have greater or lesser complexity than as represented in FIG. 8, components other than or in addition to those shown in FIG. 8 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
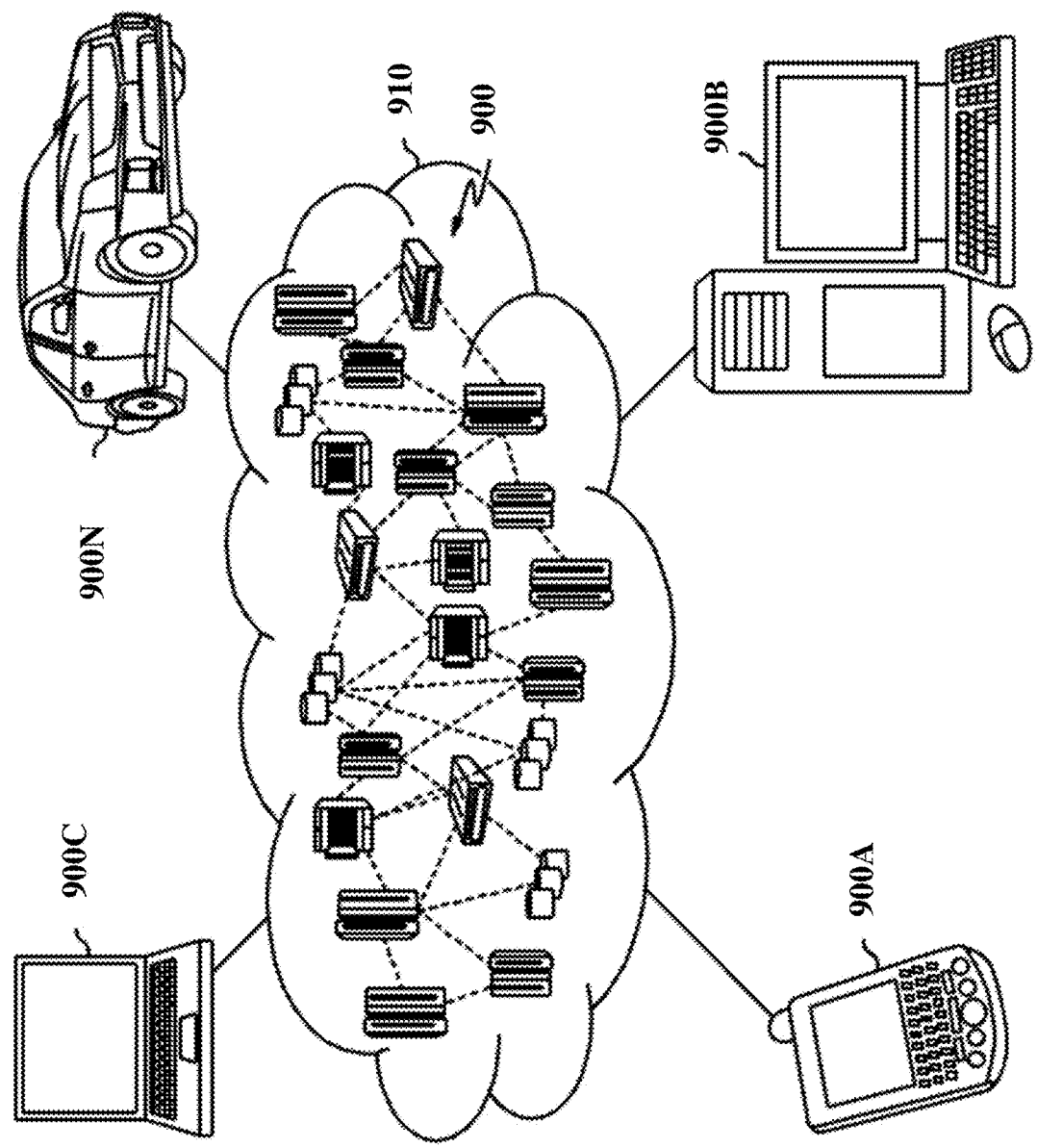
FIG. 9 depicts a cloud computing environment, according to some embodiments of the present disclosure.

Referring now to FIG. 9, which depicts a cloud computing environment 910, according to some embodiments of the present disclosure. As shown, cloud computing environment 910 includes one or more cloud computing nodes 900. The cloud computing nodes 900 can perform the methods described in FIGS. 3-7 and/or the functionality discussed in FIGS. 1, 2, and 8-10. Additionally, cloud computing nodes 900 can communicate with local computing devices used by cloud consumers, such as, for example, personal digital assistant (PDA) or cellular telephone 900A, desktop computer 900B, laptop computer 900C, and/or automobile computer system 900N. Further, the cloud computing nodes 900 can communicate with one another. The cloud computing nodes 900 can also be grouped (not shown) physically or virtually, in one or more networks, such as Private, Community, Public, or Hybrid clouds as described hereinabove, or a combination thereof. This allows cloud computing environment 910 to offer infrastructure, platforms and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
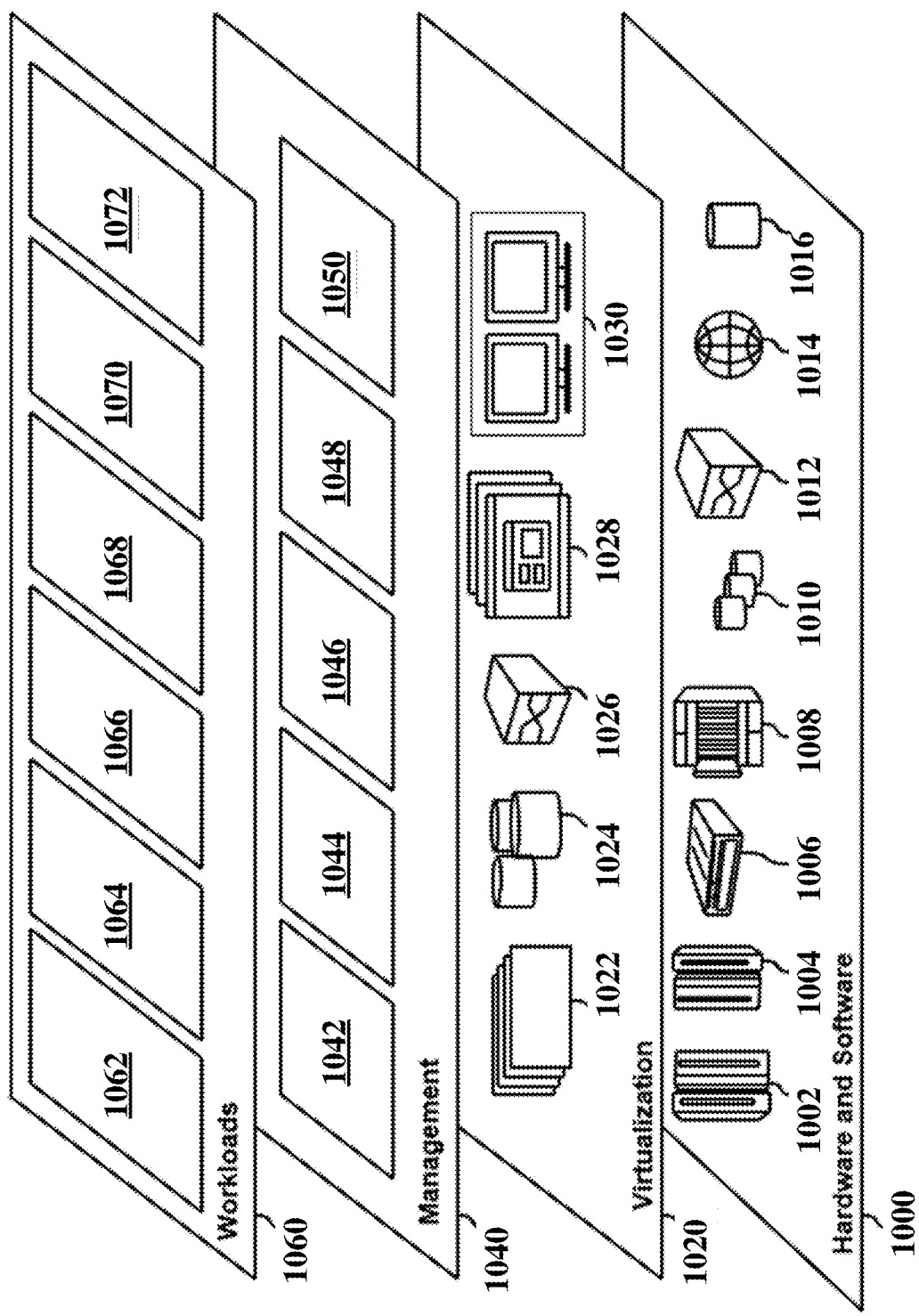
FIG. 10 depicts abstraction model layers, according to some embodiments of the present disclosure.

Referring now to FIG. 10, which depicts abstraction model layers provided by cloud computing environment 910 (FIG. 9), according to some embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1000 includes hardware and software components. Examples of hardware components include: mainframes 1002; RISC (Reduced Instruction Set Computer) architecture based servers 1004; servers 1006; blade servers 1008; storage devices 1010; and networks and networking components 1012. In some embodiments, software components include network application server software 1014 and database software 1016.

Virtualization layer 1020 provides an abstraction layer from which the following examples of virtual entities can be provided: virtual servers 1022; virtual storage 1024; virtual networks 1026, including virtual private networks; virtual applications and operating systems 1028; and virtual clients 1030.

In one example, management layer 1040 can provide the functions described below. Resource provisioning 1042 provides dynamic procurement of computing resources and other resources that are utilized to perform tasks within the cloud computing environment. Metering and Pricing 1044 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1046 provides access to the cloud computing environment for consumers and system administrators. Service level management 1048 provides cloud computing resource allocation and management such that required service levels are met. Service level management 1048 can allocate suitable processing power and memory to process static sensor data. Service Level Agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment can be utilized. Examples of workloads and functions which can be provided from this layer include: mapping and navigation 1062; software development and lifecycle management 1064; virtual classroom education delivery 1066; data analytics processing 1068; transaction processing 1070; and CCD manager 1072.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for copying and pasting charts, comprising:
   determining a chart type of a selected chart in response to a copy chart request;
   determining a plurality of chart elements of the selected chart;
   determining a plurality of measurements of a plurality of data representations of the selected chart;
   determining a plurality of corresponding numeric values for the measurements based on the chart elements;
   generating a classified and digitized chart data store based on the chart elements and the corresponding numeric values; and
   generating a conversion of the selected chart in response to a paste chart request, wherein the conversion represents a subset of the classified and digitized chart data store.

2. The method of claim 1, wherein the conversion is of a different form than the selected chart.

3. The method of claim 1, wherein a software application as a service generates the classified and digitized chart data store in response to the copy chart request.

4. The method of claim 1, wherein the chart type is selected from a group consisting of:
   a bar chart;
   a pie chart; and
   a 2-dimensional line chart.

5. The method of claim 1, wherein the chart elements comprise:
   a legend;
   a title;
   a first data element name; and
   a second data element name.

6. The method of claim 1, further comprising selecting a measurement tool based on the chart type.

7. The method of claim 6, wherein the measurement tool is selected from a group consisting of: a ruler grid tool and a protractor measurement tool.

8. The method of claim 7, wherein determining the measurements comprises executing the measurement tool with the selected chart for input.

9. The method of claim 1, wherein determining the corresponding numeric values comprises calculating the corresponding numeric values based on a predetermined conversion equation.

10. A computer program product comprising program instructions stored on a computer readable storage medium, wherein the computer readable storage medium is not a transitory signal per se, the program instructions executable by a processor to cause the processor to perform a method comprising:
    determining a chart type of a selected chart in response to a copy chart request;
    determining a plurality of chart elements of the selected chart;
    determining a plurality of measurements of a plurality of data representations of the selected chart;
    determining a plurality of corresponding numeric values for the measurements based on the chart elements;
    generating a classified and digitized chart data store based on the chart elements and the corresponding numeric values; and
    generating a conversion of the selected chart in response to a paste chart request, wherein the conversion represents a subset of the classified and digitized chart data store.

11. The computer program product of claim 10, wherein the conversion is of a different form than the selected chart.

12. The computer program product of claim 10, wherein a software application as a service generates the classified and digitized chart data store in response to the copy chart request.

13. The computer program product of claim 10, wherein the chart type is selected from a group consisting of:
    a bar chart;
    a pie chart; and
    a 2-dimensional line chart.

14. The computer program product of claim 10, wherein the chart elements comprise:
    a legend;
    a title;
    a first data element name; and
    a second data element name.

15. The computer program product of claim 10, further comprising selecting a measurement tool based on the chart type.

16. The computer program product of claim 15, wherein the measurement tool is selected from a group consisting of: a ruler grid tool and a protractor measurement tool.

17. The computer program product of claim 16, wherein determining the measurements comprises executing the measurement tool with the selected chart for input.

18. The computer program product of claim 10, wherein determining the corresponding numeric values comprises calculating the corresponding numeric values based on a predetermined conversion equation.

19. A system comprising:
    a computer processing circuit; and
    a computer-readable storage medium storing instructions, which, when executed by the computer processing circuit, are configured to cause the computer processing circuit to perform a method comprising:
       determining a chart type of a selected chart in response to a copy chart request;
       determining a plurality of chart elements of the selected chart;
       determining a plurality of measurements of a plurality of data representations of the selected chart;

determining a plurality of corresponding numeric values for the measurements based on the chart elements;

generating a classified and digitized chart data store based on the chart elements and the corresponding numeric values; and generating a conversion of the selected chart in response to a paste chart request, wherein the conversion represents a subset of the classified and digitized chart data store, and wherein the conversion is of a different form than the selected chart.

20. The system of claim 19, wherein a software application as a service generates the classified and digitized chart data store in response to the copy chart request.

* * * * *